US010877999B2

(12) United States Patent
Bielby

(10) Patent No.: US 10,877,999 B2
(45) Date of Patent: Dec. 29, 2020

(54) PROGRAMMATICALLY IDENTIFYING A PERSONALITY OF AN AUTONOMOUS VEHICLE

(71) Applicant: Micron Technology, Inc., Boise, ID (US)

(72) Inventor: Robert Richard Noel Bielby, Placerville, CA (US)

(73) Assignee: Micron Technology, Inc., Boise, ID (US)

( * ) Notice: Subject to any disclaimer, the term of this patent is extended or adjusted under 35 U.S.C. 154(b) by 336 days.

(21) Appl. No.: 15/851,730

(22) Filed: Dec. 21, 2017

(65) Prior Publication Data

US 2019/0197177 A1 Jun. 27, 2019

(51) Int. Cl.
*G06F 16/28* (2019.01)
*G05D 1/00* (2006.01)
*G06N 20/00* (2019.01)
*G06F 16/248* (2019.01)
*G06F 16/242* (2019.01)

(52) U.S. Cl.
CPC .......... *G06F 16/285* (2019.01); *G05D 1/0088* (2013.01); *G06F 16/242* (2019.01); *G06F 16/248* (2019.01); *G06N 20/00* (2019.01)

(58) Field of Classification Search
CPC .................................................... G06F 16/285
See application file for complete search history.

(56) References Cited

U.S. PATENT DOCUMENTS

| | | | |
|---|---|---|---|
| 9,817,400 B1 | 11/2017 | Poeppel et al. | |
| 2008/0133716 A1 | 6/2008 | Rao et al. | |
| 2013/0204527 A1* | 8/2013 | Schilling | G01C 21/3453 701/533 |
| 2014/0309870 A1 | 10/2014 | Ricci et al. | |
| 2015/0370272 A1 | 12/2015 | Reddy et al. | |
| 2016/0042401 A1 | 2/2016 | Menendez et al. | |
| 2016/0070898 A1 | 3/2016 | Kwok-Suzuki et al. | |
| 2016/0104486 A1 | 4/2016 | Penilla et al. | |
| 2017/0097640 A1 | 4/2017 | Wang et al. | |
| 2017/0139411 A1* | 5/2017 | Hartung | G05D 1/0077 |
| 2017/0237944 A1 | 8/2017 | Haas | |
| 2017/0267256 A1 | 9/2017 | Minster et al. | |
| 2017/0309092 A1* | 10/2017 | Rosenbaum | G07C 5/008 |

(Continued)

FOREIGN PATENT DOCUMENTS

WO 2007046613 4/2007

OTHER PUBLICATIONS

International Search Report and Written Opinion, PCT/US2018/048390, dated Dec. 14, 2018.

*Primary Examiner* — Dawaune A Conyers
(74) *Attorney, Agent, or Firm* — Greenberg Traurig

(57) ABSTRACT

Systems and methods for assigning personalities to autonomous vehicles are disclosed. In one embodiment, a method is disclosed comprising receiving data from an autonomous vehicle; generating a vector representing the autonomous vehicle based on the data; classifying the vector into one or more personalities; receiving a search query from a user; identifying one or more autonomous vehicles responsive to the search query based on personalities assigned to the one or more autonomous vehicles, the one or more autonomous vehicles including the autonomous vehicle; and transmitting the one or more autonomous vehicles to the user.

20 Claims, 11 Drawing Sheets

(56) References Cited

U.S. PATENT DOCUMENTS

| | | |
|---|---|---|
| 2018/0096417 A1* | 4/2018 | Cook ................ G06Q 30/0243 |
| 2018/0265094 A1 | 9/2018 | Graney |
| 2018/0275667 A1 | 9/2018 | Liu et al. |
| 2018/0288605 A1 | 10/2018 | Griffin et al. |
| 2018/0330417 A1* | 11/2018 | Wollmer .............. G06Q 40/025 |
| 2019/0049981 A1 | 2/2019 | Fischer |
| 2019/0283761 A1 | 9/2019 | Bielby |
| 2019/0291719 A1 | 9/2019 | Tiziani |
| 2019/0371093 A1* | 12/2019 | Edren ................ G07C 5/0808 |

* cited by examiner

PROGRAMMATICALLY IDENTIFYING A PERSONALITY OF AN AUTONOMOUS VEHICLE

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever

BACKGROUND

The disclosed embodiments are directed toward generating personalities for autonomous vehicles and, in particular, for identifying personalities using automated models.

Non-autonomous vehicles are subject to significant analysis. Many websites, applications, and services track details regarding non-autonomous vehicles such as mileage, repairs, accidents, and other details (including relatively generic details such as book values).

While these applications provide high-level information on vehicles, they do not leverage the wealth of data generated by autonomous vehicles. Specifically, current systems still retain the same classification and data analysis routines used for non-autonomous vehicles. Current systems generally lack any technical solution for processing the wealth of data generated by autonomous vehicles. Additionally, no clear technical solution exists to convert raw autonomous vehicle data into a meaningful measurement.

In addition to these limitations, the use of machine learning by autonomous vehicles results in differentiation between the operations of autonomous vehicles. Specifically, as autonomous vehicle systems "learn" how to operate in various circumstances, each autonomous vehicle may have a distinct "personality." That is, certain autonomous vehicles may respond to certain circumstances in a particular way. The challenge with identifying such personalities is that the raw data representing the personality is highly unstructured.

Thus, there exists a need in the art for systems and methods for first parsing the voluminous raw data produced by autonomous vehicles in order to generate meaningful statistics. The minimization of data enables representative statistics to be properly processed using machine learning techniques. Additionally, there is a need in the art for machine learning systems that can predict autonomous vehicle personalities based on past performance aggregated over a large fleet of autonomous vehicles.

BRIEF SUMMARY

The disclosed embodiments solve the above-identified problems by providing systems and methods for intelligently assigning a personality to an autonomous vehicle.

The disclosed embodiments describe systems and methods for receiving raw autonomous vehicle data from respective autonomous vehicles. The disclosed embodiments further describe specific techniques for parsing this data to generate an autonomous vehicle object that represents aggregated statistics defining the operating characteristics of the autonomous vehicle.

From these aggregated statistics the disclosed embodiments describe techniques for generating one or more representative personalities to categorize a given autonomous vehicle. In one embodiment, a specific technique for matching an autonomous vehicle object to a set of personality rules is disclosed. In another embodiment, a machine learning and natural language processing pipeline is disclosed that first clusters a set of autonomous vehicle objects into correlated subsets. Each subset is then analyzed (using third-party textual data) to automatically surface personality identifiers based on sentiment analysis. After categorizing the clusters, each autonomous vehicle object is used as training data to a machine learning system in order generate generalized personality models that may be utilized for future autonomous vehicles.

The following detailed description describes the specific technical implementations of these operations.

BRIEF DESCRIPTION OF THE FIGURES

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
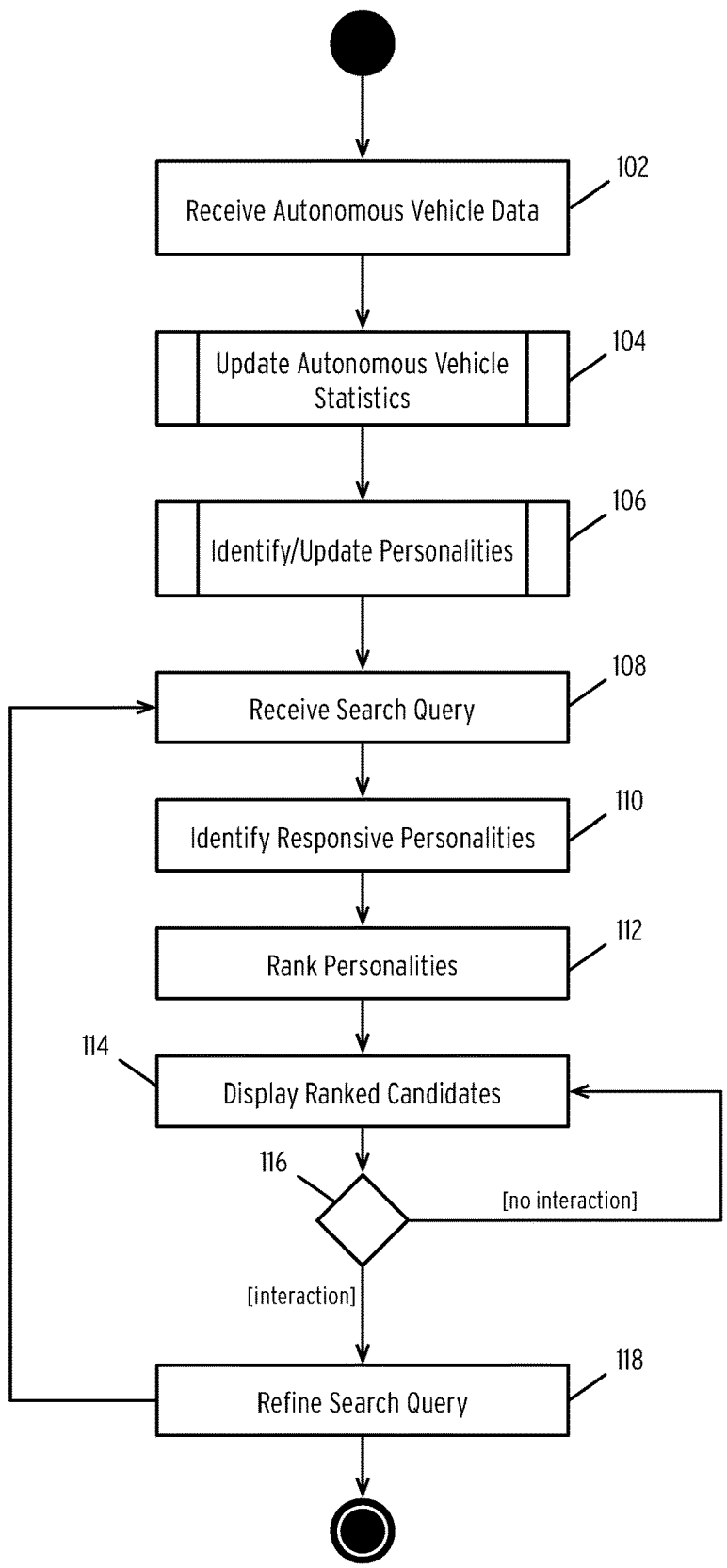
FIG. 1 is a flow diagram illustrating a method for generating an autonomous vehicle personality and identifying a vehicle in response to a personality search query according to some embodiments of the disclosure.

FIG. 1 is a flow diagram illustrating a method for generating an autonomous vehicle personality and identifying a vehicle in response to a personality search query according to some embodiments of the disclosure.

In step 102, the method receives autonomous vehicle data.

In one embodiment, autonomous vehicle data comprises any data relating to the operation of an autonomous vehicle. Examples of autonomous vehicle data comprise data such as records of the autonomous vehicles speed, repairs performed on the vehicle, faults or other autonomous vehicle component issues, routes taken, a log of commands issued prior to an accident, costs incurred by the vehicle, income generated by the autonomous vehicle (e.g., if the autonomous vehicle is a livery vehicle), and any other types of data relating to the operation of the autonomous vehicle, including any data generated by sensor of the vehicle.

In one embodiment, autonomous vehicle data comprises lower-level control data associated with the autonomous vehicle. For example, the autonomous vehicle data may comprise an accuracy of a GPS receiver for a plurality of GPS readings. As another example, autonomous vehicle data may comprise a sequence of commands sent to a transmission control unit (TCU) or engine control unit (ECU) over a given time period.

In one embodiment, the method receives the autonomous vehicle data in real-time. In other embodiments, the method receives autonomous vehicle as part of a batch upload process.

In one embodiment, the method receives autonomous vehicle data directly from a vehicle. In other embodiments, the method may receive autonomous vehicle data from an autonomous vehicle manufacturer.

As will described in more detail below, the autonomous vehicle data the method receives comprises low level control data and does not include any correlation data. That is, the autonomous vehicle data does not include a result or determination made based on the underlying autonomous vehicle data.

In one embodiment, each item of data the method receives in step 102 is associated with autonomous vehicle. In one embodiment, this association includes a make, model, and year of the autonomous vehicle. Alternatively, or in conjunction with the foregoing, the association may include details regarding various options or modifications to a base model of the autonomous vehicle. In some embodiments, the method stores a database of known autonomous vehicles and autonomous vehicle details. In this embodiment, the method may only receive an autonomous vehicle identification in step 102.

In step 104, the method updates autonomous vehicle statistics associated with a vehicle.

In an initial state, a given autonomous vehicle may not be associated with any statistics. In this state, the vehicle is only associated with a make, model, year, and any modifications to a base model of the autonomous vehicle.

As the method receives autonomous vehicle data, the method updates statistics associated with the vehicle. Details of example techniques for updating autonomous vehicle statistics are described in the descriptions of FIGS. 2A-2F, the detail of which is incorporated herein by reference in its entirety.

The illustrated method may operate on an individual basis or on a class basis. Using an individual basis, the method may update autonomous vehicle statistics for a specific autonomous vehicle (e.g., a specific vehicle with a vehicle identification number). Using a class basis, the method may update autonomous vehicle statistics for a class of autonomous vehicle (e.g., a specific make, model, or year). In some embodiments, the method may further operate on a component basis. In this embodiment, statistics for specific subsystems of autonomous vehicles may be updated as data is received. For example, an operating system of an autonomous vehicle and a transmission model of an autonomous vehicle may be used as the entity to which statistics are associated.

As an example, an individual autonomous vehicle may be represented as follows:

```
{
    make: "CarCo",
    model: "X1",
    year: "2017",
    statistics: { }
}
```

In this example, the statistics for the "2017 CarCo X1" are empty.

Subsequently, the method may receive speed data for the vehicle:

| TIME | SPEED (MPH) |
|------|-------------|
| 0001 | 045 |
| 0002 | 046 |
| 0003 | 052 |
| 0004 | 075 |
| ... | |
| 0008 | 065 |
| 0009 | 076 |
| 0010 | 100 |
| ... | |
| 0015 | 095 |
| 0016 | 062 |
| 0017 | 000 |

Although the timestamps are exemplary, the speed data represents the speed of the autonomous vehicle over time. In one embodiment, the method may store the speed data in the statistics field of the autonomous vehicle object. However, storage of all speed data may be inefficient and unnecessary for further processing. Thus, in another embodiment, the method may extract key metrics from the raw speed data. In this example, times 0001 through 0002 represent a gradual speed increase while times 0003 through 0004 and 0009 through 0010 represent rapid accelerations. Similarly, times 0015 through 0017 indicates a rapid deceleration. Thus, the method may analyze the speed data using a sliding window to identify rapid accelerations or decelerations. Thus, using the above speed data as an example, the method may update the autonomous vehicle statistics as follows:

```
{
    make: "CarCo",
    model: "X1",
    year: "2017",
    statistics: {
        drive_time: 3600000
        rapid_accelerations: 2,
        rapid_decelerations: 1
    }
}
```

In some embodiments, the method may additionally store a total drive time of the autonomous vehicle (3,600,000 milliseconds, or, 1 hour) in order to place the accelerations and decelerations in context.

Continuing the example, the method may receive data regarding faults and repairs and other system events:

| TIME | EVENT |
|---|---|
| 0020 | MISFIRE (CYLINDER 1) |
| 0021 | HIGH COOLANT TEMP |
| 0022 | MISFIRE (CYLINDER 1) |
| 0023 | LOW TIRE PRESSURE (FRONT DRIVER) |
| 0024 | HIGH IAT |
| 0025 | MISFIRE (CYLINDER 1) |
| 0026 | NORMAL COOLANT TEMP |
| 0027 | SERVICED |
| 0027 | TIRE PRESSURE OK |
| 0028 | OS RESTART (CRITICAL FAULT) |
| 0029 | UNABLE TO ENGAGE GEAR 1 |
| 0030 | INITIATE LOG BACKUP |
| 0031 | MISFIRE (CYLINDER 1) |

Here, the log illustrates a combine log that combines traditional on-board diagnostic (OBD) data as well as entries specific to autonomous vehicles. In general, the description places no limit on the particular generator of log data or the format thereof. In the above log, a cylinder misfire event is detected four times (0020, 0022, 0025, and 0031). Additionally, a high coolant temperature alert (0021), a low tire pressure alert (0023), a high intake air temperature alert (0024), an unable to engage gear alert (0029), a critical operating system (OS) restart alert (0028) are detected in the log. Additionally, non-critical entries such as an initiate log backup (0030) are detected. The method additionally detects that the vehicle was serviced (0027) and that the coolant temperature returned to normal at 0026.

As with speed data, the method may synthesize higher-level statistics based on the lower-level log files. For example, the autonomous vehicle object may be updated as:

```
{
    make: "CarCo",
    model: "X1",
    year: "2017",
    statistics: {
        drive_time: 172800000
        rapid_accelerations: 2,
        rapid_decelerations: 1,
        service_times: 1,
        faults: 9,
        critical_faults: 3
    }
}
```

Here, the number of "faults" may correspond to any fault, regardless of severity. In many instances, this number may be artificially high. Thus, the method may further generate a critical fault count to separate those faults which are significantly problematic. Additionally, the method records the number of times that the vehicle was serviced.

As a final example, the method may receive a listing of commands recorded prior to an accident:

| TIME | LOG |
|---|---|
| 0001-1 | LAT/LON 29°58'45.03"N 31°08'03.69"E |
| 0001-2 | CAM1 PED [N 1.23MPS E] |
| 0001-3 | CAM1 UNKNOWN [NW 1.2M] |
| 0001-4 | LID PED 1.5M |
| 0001-5 | LID UNKNOWN 0.75M |
| 0002-1 | LID PED 1M |
| 0002-2 | TX SWA −45° |
| 0002-3 | TX ECU SP 0 |
| 0003-1 | AIRBAG DEPLOYED |

The above log of commands may represent commands issued on a CAN bus and monitored by an autonomous vehicle. The above listing of commands is necessarily hypothetical and limited for illustrative purposes only. The specific format of CAN and other bus commands may vary.

As illustrated above, a location is recorded at time 0001-1. At time 0001-2 a pedestrian is identified to the north of the autonomous vehicle, moving east at 1.23 meters per second. At time 0001-3 another camera detects an 1.2 meter, unknown object 1.2 meters northwest of the vehicle. At time 0001-4, a Lidar sensor detects that the pedestrian is 1.5 meters way and at time 0001-5 a Lidar sensor detects that the unknown object is 0.75 meter away. At time 0002-1, the Lidar sensor detects the pedestrian is one meter away and the autonomous vehicle issues commands to actuate the steering wheel −45 degrees (i.e., to the west) and rapidly decrease the speed. At time 0003-1, the log indicates that an airbag was deployed.

Notably, the above log illustrates an exemplary scenario where an autonomous vehicle must determine whether to swerve toward the unknown object or hit the pedestrian in front of the vehicle. Such decisions are of increasing concern to purchases and/or passengers of autonomous vehicles. In the illustrated embodiment, the method analyzes the log file to extract statistics on how the autonomous vehicle responds to accident scenarios. Thus, the method may update the autonomous vehicle object to include:

```
{
    make: "CarCo",
    model: "X1",
    year: "2017",
    statistics: {
        drive_time: 172800000
        rapid_accelerations: 2,
        rapid_decelerations: 1,
        service_times: 1,
        faults: 9,
        critical_faults: 3,
        accidents: {
            count: 1
            tendency: {
                pedestrian: 0,
                operator: 1,
                indeterminate: 0
            }
        }
    }
}
```

Here, the "accidents" statistics is more complex than the previous statistics. The method records first a count of the number of accidents involving the autonomous vehicle. Next, the method records whether, for each accident, the autonomous vehicle opted to hit a pedestrian or the driver or the operator of the autonomous vehicle.

In step 106, the method identifies or updates personalities for a given vehicle.

As used herein, a personality refers to a combination of vehicle statistics (and/or data points) that are correlated around a common theme. For example, a "low maintenance" personality may combine a lack of required servicing, a minimal number of faults, and a minimal number of critical faults. Similarly, an "economical" personality may comprise a high number of revenue generating routes (discussed below), a high gas mileage rating, and a low servicing. Similarly, a "safe" personality may comprise a high statistical likelihood that the driver will not be injured in an accident and a low number of accidents. In some embodiments, these examples are examples of "micro-personalities." As used herein a micro-personality comprises a personality including, as sub-components, raw data metrics. In contrast, a "macro-personality" refers to a combination of micro-personalities. For example, a "low maintenance" personalities combined with an "economical" personality may comprise a "budget" autonomous vehicle.

In some embodiments, personalities may be identified manually. However, in some embodiments personalities may be identified using a machine learning algorithm (e.g., a neural network or clustering algorithm). For example, the method may utilize the generated autonomous vehicle objects as a training data set for a clustering system (e.g., a k-means clustering algorithm or a neural network). In this embodiment, the method utilizes the machine learning system to surface connections between the various statistics generated in step 104.

After identifying relevant clusters of autonomous vehicle objects, the method assigns each cluster to a personality. In some embodiments, this identification may be performed by human editors. However, to automate this procedure, the method may utilize one or more natural language processing (NLP) pipelines to automatically generate personality types. For example, the method may extract a listing of makes, models, and/or years for each autonomous vehicle in a cluster. The method may then extract text snippets associated with each of these autonomous vehicles. These text snippets may comprise industry reviews, consumer comments, and other various freeform text associated with autonomous vehicles in the cluster. The method may then use the combined set of text snippets to extract a personality type from the text. For example, many text snippets may utilize the term "lemon" which may indicate that the clustered autonomous vehicles should be assigned a "lemon" personality. The method may then analyze the properties of the clustered autonomous vehicle objects to extract the common or correlated statistics and generate a new personality type that associates the common or clustered statistics with the personality identifier. In this manner, the personality type may be saved and applied to new vehicles.

In step 108, the method receives a search query.

In one embodiment, the method may provide a search interface to a user. In a first embodiment, the interface may comprise a web page. In a second embodiment, the interface may comprise a mobile application. In each of these embodiments, the interface may be provided as part of an application allowing users to search for autonomous vehicles to purchase. Alternatively, or in conjunction with the foregoing, the interface may be provided as part of a taxi or ride-sharing application.

In each scenario, users may enter personality queries into the interface. In one embodiment, the interface may provide a dropdown list of personalities allowing the user to select one or more personalities to search. In some embodiments, the interface may allow for the chaining of personalities as AND or OR operations.

Alternatively, or in conjunction with the foregoing, the interface may allow for a plaintext query. In this embodiment, the method may utilize NLP algorithms to match a plaintext query to a number of personalities. For example, the method may utilize NLP semantic analysis routines to identify a sentiment of the query. The method may then attempt to match this sentiment to a sentiment associated with each personality. In some embodiments, as part of step 106, the method may generate a listing of sentiments associated with the text used to generate the personality types.

In step 110, the method identifies responsive personalities.

In one embodiment, the method explicitly identifies personalities as indicated by a dropdown menu discussed previously. In some embodiments, the method may identify personalities using semantic analysis. In addition, the method may identify macro- and micro-personalities. For example, the user query may indicate a macro-personality and the method may identify one or more micro-personalities. For example, a "safe" macro-personality may be deconstructed into a "low maintenance" and "safe for driver" micro-personality.

In step 112, the method ranks the personalities.

In some embodiments, ranking personalities may be optional. In one embodiment, the method may rank the personalities based on the number of autonomous vehicles associated with each personality. Alternatively, or in conjunction with the foregoing, the method may rank the personalities based on the correspondence to the user search query. For example, when NLP techniques are used to predict a sentiment of a query, each sentiment may be associated with a confidence level that the sentiment is correct. In this embodiment, the confidence of the sentiment may be propagated to any personality associated with the sentiment. In this manner, the personalities may be ranked based on the corresponding sentiment confidence levels.

In step 114, the method displays the ranked candidate personalities and/or autonomous vehicles.

In one embodiment, the method displays the ranked candidates as part of a web page or a mobile application. For example, the method may return a search results page (SERP) displaying a list of autonomous vehicles and/or personalities for a user to review. In another embodiment, the method may update a listing of personalities and/or autonomous vehicles in a mobile application. In another embodiment, the method may display a list of autonomous vehicles nearby to the user that match the query (in the example where the mobile app is a taxi or ride-sharing application).

In step 116, the method determines if a user interaction was performed. If no interaction is detected, the method may continue to display the ranked candidates.

Alternatively, if the method detects an interaction, the method may refine the search query in step 118.

In one embodiment, the interaction may comprise a user selecting a given autonomous vehicle displayed on the user device. In another embodiment, an interaction may comprise a user "hiding" a displayed autonomous vehicle.

In one embodiment, the method uses the interaction to further refine the personality data. For example, if the method retrieves a list of "low maintenance" autonomous vehicles and the user selects a given autonomous vehicle, this interaction may be reported to the method and the method may increase the confidence of the personality assigned to the selected autonomous vehicle. Conversely, if a user "hides" a given autonomous vehicle, the personality confidence for that autonomous vehicle may be reduced. In this manner, the method uses the user feedback to further refine the classification procedure. This feedback may be incorporated into subsequent personality prediction iterations.

In addition to providing feedback, the interaction may trigger a new search query. In one embodiment, the interaction may comprise a refinement of the search query parameters (e.g., personalities). In this embodiment, the method may generate a new search query based on the interaction and issue a new search query, repeating steps 108-116.

Figure 2A:
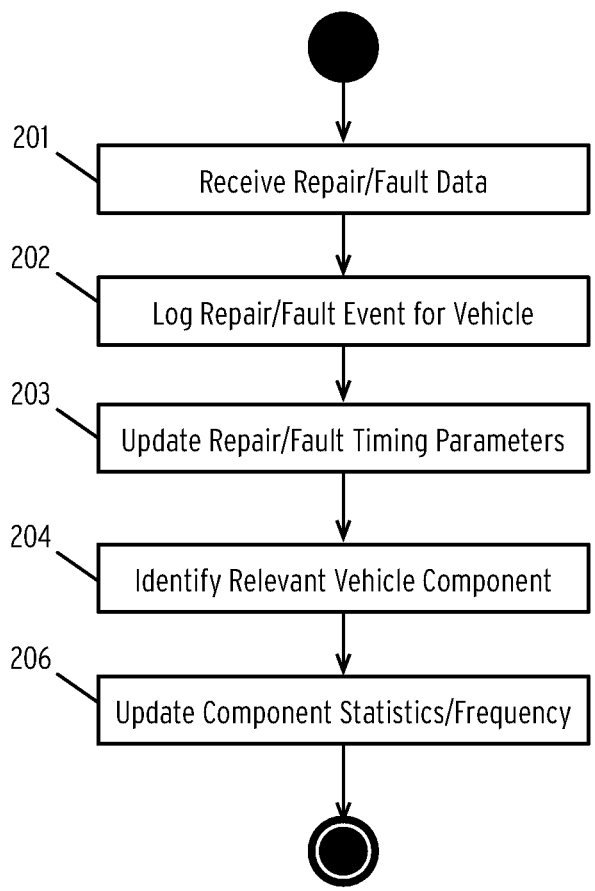
FIG. 2A is a flow diagram illustrating a method for updating autonomous vehicle component statistics according to some embodiments of the disclosure.

FIG. 2A is a flow diagram illustrating a method for updating autonomous vehicle component statistics according to some embodiments of the disclosure.

In step 201, the method receives repair and/or fault data.

As described above, in some embodiments repair and fault data may be received automatically from an autonomous vehicle. In one embodiment, the repair and fault data comprises a listing of events that represent maintenance performed and faults detected, respectively, by an autonomous vehicle. In some embodiments, this data may be received directly from an autonomous vehicle. Alternatively, or in conjunction with the foregoing, the data may be received from a maintenance provider and/or an autonomous vehicle manufacturer.

In optional step 202, the method logs the repair or fault data for the autonomous vehicle. In this step, the method may store all repair and fault data associated with a given vehicle for later usage. In one embodiment, the method stores this data in a data warehouse and does not significantly process the data.

In step 203, the method updates repair and fault timing parameters.

As briefly discussed previously, the method in step 203 determines how frequently repairs or faults occur. In one embodiment, the method utilizes a pre-defined window length to inspect the repair and fault data. For example, the method may set a window length of three days for faults and six months for repairs. In another embodiment, the method may select a given repair or fault and identify the most recent matching repair or fault. For example, upon detecting a repair the method may analyze the autonomous vehicle object to determine when a repair last occurred and use that last repair to calculate an average time between repairs. In this manner, the method may constantly refine the average time between repairs.

With respect to faults, the method may select a given fault and identify any previous faults that match the selected fault. As used herein, a fault refers to any malfunctioning component or system of an autonomous vehicle.

In step 204, the method identifies the relevant vehicle component associated with the fault or repair.

As discussed previously, each log entry may identify a specific component of the autonomous vehicle that is subject to the repair or is experiencing a fault. In this manner, the method extracts the component for further processing.

In step 205, the method updates component statistics and frequencies.

Using repairs as a first example, the method may identify that the radiator was repaired in step 204. The method previous had identified that this radiator was repaired twice, once last month and a second time two months ago. If the vehicle is in operation for three months, the method sets the radiator repair frequency to once per month. Additionally, the method updates the radiator statistics to indicate three total repairs.

Similarly, the method may detect numerous radiator faults during the three month period. Assuming two faults prior to each repair, the method sets the radiator fault frequency to twice a month and the fault statistics to six.

The illustrated method may be repeated for each fault and repair and, by proxy, for each component that is subject to a fault or repair. In this manner, the above method generates a statistical picture of all components of the autonomous vehicle. In some embodiments, the method may initialize a listing of components to be repair and fault free. Thus, the component portion of an autonomous vehicle may represent a total picture of the faults and maintenance required for each component of a vehicle.

Alternatively, in some embodiments, the method may further assign a severity level to each fault or repair. For example, major transmission faults and repairs may be assigned a "critical" severity level. Similarly, major operating system malfunctions may be assigned a critical severity level. Conversely, minor faults such as low windshield wiper fluid may be assigned a non-critical severity level. In some embodiments, a given component may be assigned multiple levels of faults if multiple faults occur. In some embodiments, the method may average the fault levels to store an average fault level for each component.

In some embodiments, the results of the processing of the method illustrated in FIG. 2A may be used as a training data set to predict future faults and or repair dates. In some embodiments, a neural network or Markov model may be utilized to model the timing of repairs and/or faults. Additionally, the method may utilize speed or engine data (discussed infra) to refine the modeling of repair/fault frequency.

Figure 2B:
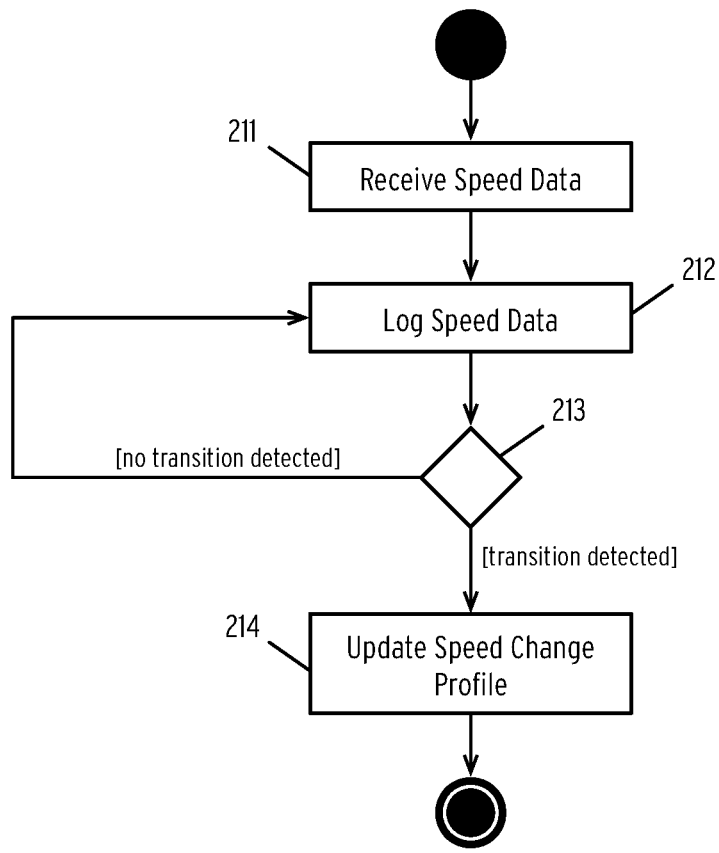
FIG. 2B is a flow diagram illustrating a method for updating autonomous vehicle speed statistics according to some embodiments of the disclosure.

FIG. 2B is a flow diagram illustrating a method for updating autonomous vehicle speed statistics according to some embodiments of the disclosure.

In step 211, the method receives speed data.

As described above, in some embodiments speed data may be received automatically from an autonomous vehicle. In one embodiment, the speed data comprises a listing of speeds of an autonomous vehicle recorded by the autonomous vehicle. In some embodiments, this data may be received directly from an autonomous vehicle. Alternatively, or in conjunction with the foregoing, the data may be received from an autonomous vehicle manufacturer.

In optional step 212, the method logs the speed data. In this step, the method may store all speed data associated with a given vehicle for later usage. In one embodiment, the method stores this data in a data warehouse and does not significantly process the data.

In step 213, the method iterates through the speed data and determines if a transition exists.

In one embodiment, a transition comprises a quick acceleration or deceleration. To detect, the method may analyze a batch of speed measurements and determine if a difference between speeds in the batch exceeds a predefined threshold, indicating a rapid acceleration or deceleration. If no such difference exists, the method continues to log speed data and iterate through a batch of measurements.

In step 214, the method updates a speed change profile associated with an autonomous vehicle if a speed transition is detected.

As described previously, the transition comprises a rapid acceleration or deceleration. If the transition is an acceleration, the method updates a count of rapid accelerations of the autonomous vehicle. If the transition is a deceleration, the method updates a count of rapid decelerations of the autonomous vehicle. In this manner, the method stores a historical record of the number of acceleration and decelerations that exceed a pre-determined threshold.

In some embodiments, the method may introduce an additional gating function to limit the number of false positives. For example, in addition to speed data, the method may receive a log of sensor recordings. In this example, the method may cross-reference the speed data with the sensor data to determine whether the acceleration or deceleration was warranted. For example, the method may determine if a camera or radar/Lidar sensor indicated that an object was unexpectedly placed in front of the autonomous vehicle. Upon detecting that a rapid deceleration occurs in conjunction with the detection of the object, the transition detected in step 213 may be discarded as the deceleration may be deemed warranted.

As discussed above, the number of accelerations and decelerations may be used in conjunction with the repair/fault data in FIG. 2A to refine a predictive model to determine when certain components will experience faults and/or need repair. As an example, a record of frequent brake faults/repairs with an absence of rapid decelerations may indicate a potential issue with the braking system itself. Conversely, a correlated pattern of decelerations may indicate that the vehicle causes the underlying repairs/faults.

Figure 2C:
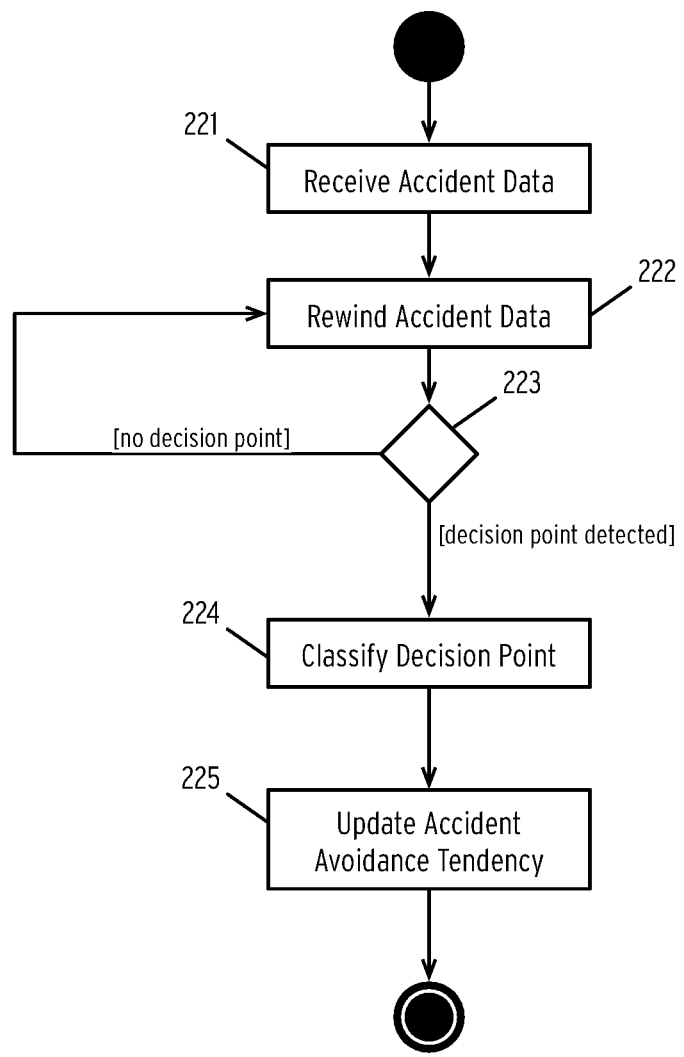
FIG. 2C is a flow diagram illustrating a method for updating autonomous vehicle decision-making statistics according to some embodiments of the disclosure.

FIG. 2C is a flow diagram illustrating a method for updating autonomous vehicle decision-making statistics according to some embodiments of the disclosure.

One of the biggest issues currently facing autonomous vehicles is the decisions made by autonomous vehicles during potentially life-threatening situations. Often, a decision must be made to strike a pedestrian or swerve to avoid the pedestrian, potentially injuring or killing the occupant of the autonomous vehicle. This issue is further by the lack of reliable training data given the mortal consequences of the decision.

In step 221, the method receives accident data.

In some embodiments, the accident data comprises a log of commands issued by the autonomous vehicle prior to an accident. In some embodiments, an accident is identified by the triggering of one or more impact sensors of the autonomous vehicle. In some embodiments, the accident may comprise a predefined window of event data occurring prior to the accident (e.g., 30 seconds or one minute).

In step 222, the method rewinds the accident.

In one embodiment, the method beings analyzing log data at the point an accident is detected (e.g., a log entry indicating an impact sensor was triggered). The method then steps through each previous log entry.

In step 223, the method determines if a decision point was reached.

In some embodiments, a decision point comprises a command issued by the autonomous vehicle to a control unit that is unexpected. In some embodiments, the method may analyze the log entries to first extract any changes in steering direction or engine speed as such events are indicative of an autonomous vehicle changing course in response to a potential hazard. In some embodiments, the last change in speed and/or direction may be used as the decision point.

However, in some embodiments, the log may include multiple changes in speed and/or direction. In this embodiment, the method may store the first-detected speed and direction changes and proceed to analyze any preceding changes in speed or direction. The method may then identify a speed and/or direction change that deviates significantly from a log of speed/direction records. In general, the method attempts to isolate a change in speed or direction that differs significantly from a routine speed or routine direction.

If no decision point is detected, the method continues to step through the accident data (step 222).

In step 224, the method classifies the decision point upon detecting the decision point.

Various methods may be used to classify a decision point. In a first embodiment, a detection that the vehicle radically changed speeds or directions may indicate that the vehicle decided to risk the occupant's life versus colliding with an object or pedestrian. Conversely, a decision not to change speed or direction (or, to only change speed) may indicate that the autonomous vehicle determined to risk a collision with the object/pedestrian versus risking the occupant's life.

In a more nuanced embodiment, the method may analyze sensor data surrounding the decision point. For example, the method may analyze camera and Lidar/radar data to determine the objects detected by the vehicle prior to impact. In some embodiments, this data may identify the objects detected by the vehicle as well as their position relative to the autonomous vehicle. The method may then analyze changes in speed and direction to determine how to classify the decision point.

In some embodiments, the data may indicate that the autonomous vehicle attempted to change course into an empty area (versus colliding with another object). In this embodiment, the autonomous vehicle decided to risk the occupant's life however the risk was small. This is in contrast to the decision to collide with a detected barrier or other object. In this embodiment, the method may still classify the decision as risking the occupant's life but may assign a severity level to the risk as low.

In step 225, the method updates an accident avoidance tendency for the autonomous vehicle.

In one embodiment, step 225 comprises updating a count of accidents experienced by the vehicle. Additionally, the method may tabulate the number of instance where the vehicle risked the occupant's life versus risked colliding with a pedestrian or other object.

In some embodiments, the above processing may be applied not only to accidents but also to an entire event log of an autonomous vehicle. In this embodiment, the method rewinds a log to generally identify rapid changes in speed or direction. In this embodiment, an impact sensor may not be triggered (if the autonomous vehicle avoids a danger) but may still be used to generally classify the decisions made by the autonomous vehicle. For example, a decision to exit a roadway in response to a detected danger may indicate a propensity for risking the occupant's life. In this manner, the method may generate an overall count of how many times an autonomous vehicle risked an occupant's life or safety (regardless of severity) versus protected the occupant.

Figure 2D:
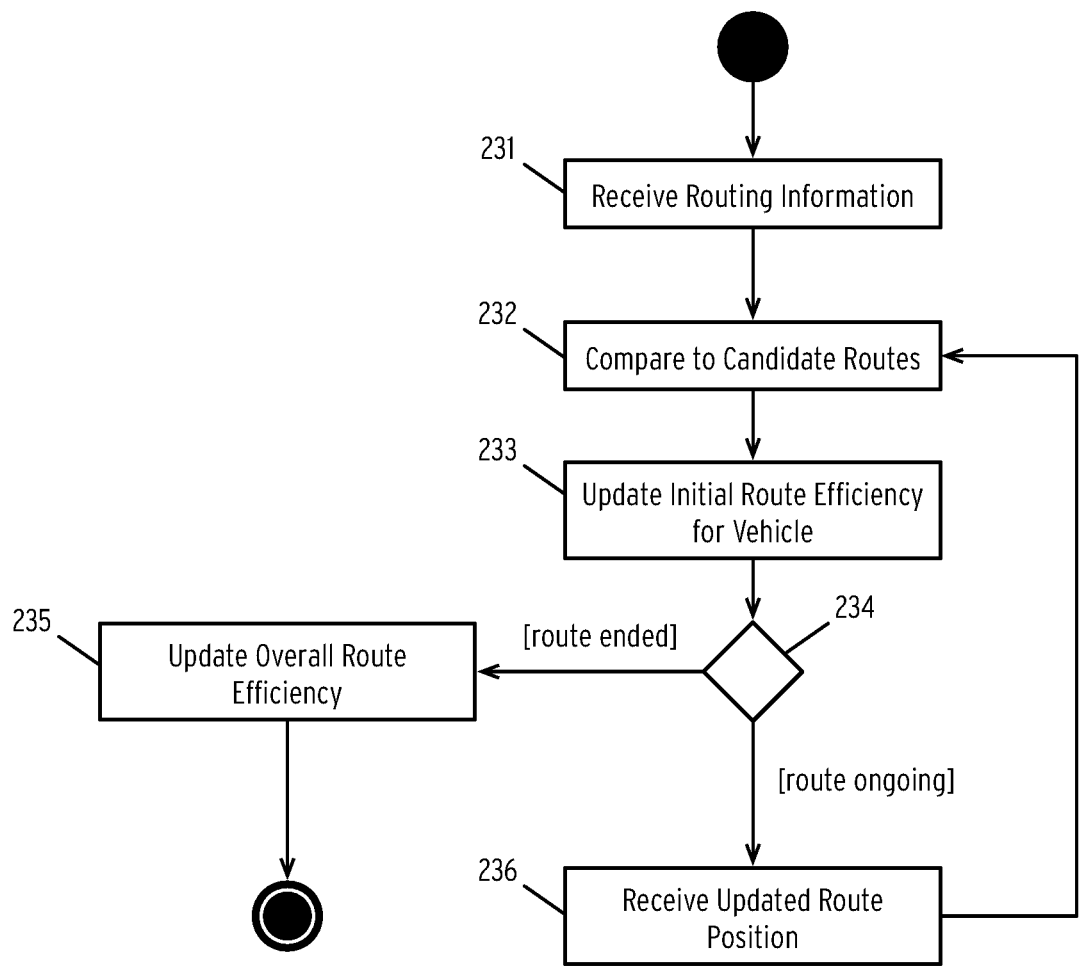
FIG. 2D is a flow diagram illustrating a method for updating autonomous vehicle route efficiency statistics according to some embodiments of the disclosure.

FIG. 2D is a flow diagram illustrating a method for updating autonomous vehicle route efficiency statistics according to some embodiments of the disclosure.

In step 231, the method receives routing information from an autonomous vehicle.

In one embodiment, when an autonomous vehicle computes a route to a destination, the autonomous vehicle may transmit the routing details to a centralized server. In some embodiments, the routing information includes an origin, destination, route steps, and an estimated travel time.

In step 232, the method compares the received routing information to a list of candidate routes.

In one embodiment, the method uses the origin and destination to compute a candidate set of routes. The method may then compare the distance traveled or estimated travel time in the received route to the distances/times of the candidate routes. If the receive route is longer (either in distance or duration), the method updates a field in the autonomous vehicle object indicating that the initial routing is more inefficient to a candidate route.

In step 233, the method updates the initial route efficiency for the autonomous vehicle based on the comparison in step 232.

In some embodiments, the measure of inefficiency may comprise an indication of the additional time and/or distance required by the received route. For example, if the receive route has an estimated travel time of 1 hour and a candidate route has an estimated travel time of 45 minutes. The initial efficiency of the received route may be set at 75%.

In step 234, the method determines if the autonomous vehicle is still proceeding along the route the method receives an updated route position in step 236.

In some embodiments, the updated route position may include the current location, the routing steps, and the destination. Again, the method compares this updated routing information to a set of generated candidate routes. The method then, in step 233, updates the route efficiency as the autonomous vehicle progresses along the route.

Continuing the previous example, the update route may have a time of 55 minutes after five minutes have elapsed. As a first permutation, the best candidate route may have an estimated travel time of 40 minutes. In this case, the current route efficiency may be calculated as 72.7%. As a second permutation, the best candidate route may have an estimated travel time of 58 minutes. In this case, the current route efficiency outperforms the candidate routes and the efficiency may be calculated as 105%.

In step 234, the method determines that the route has ended.

In step 235, the method calculates an overall route efficiency.

In one embodiment, the method may average the initial efficiency and the updated efficiencies. In the first permutation above, the overall efficiency is 73.9%. In the second permutation, the overall efficiency is 90%. In some embodiments, the updated efficiencies may be weighted higher than the initial efficiency to place an emphasis on updated routing.

In one embodiment, the method may be performed for each unique route and each unique route may be averaged to obtain an overall routing efficiency of the autonomous vehicle. In some embodiments, the method may segment routes based on routing characteristics. For example, the method may discard routes with unusually high levels of traffic. As a second example, the method may classify routes into long trips and short trips. As a third example, the method may classify routes into city or country routes. Each segmented route type may be associated with an aggregated routing efficiency.

Figure 2E:
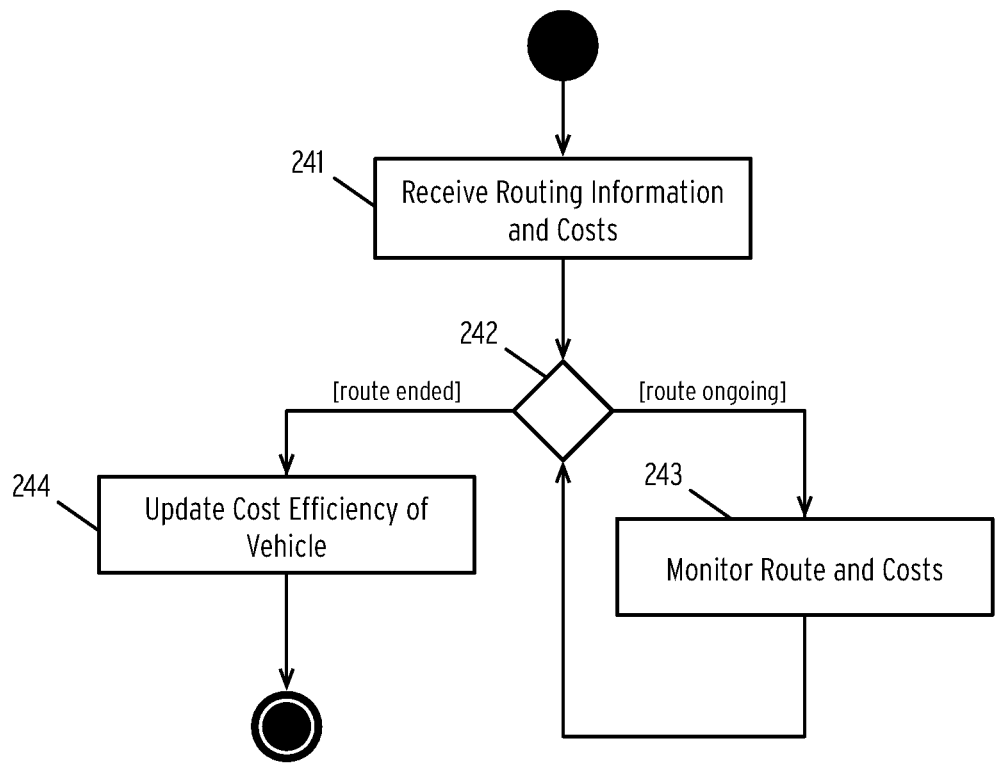
FIG. 2E is a flow diagram illustrating a method for updating autonomous vehicle cost efficiency statistics according to some embodiments of the disclosure.

FIG. 2E is a flow diagram illustrating a method for updating autonomous vehicle cost efficiency statistics according to some embodiments of the disclosure.

In step 241, the method receives routing information and costs associated with the route.

Routing information was discussed in connection with FIG. 2D and details of routing information is not repeated herein but is incorporated by reference in its entirety.

As used herein, costs refer to the expenditures required to complete a given route. In one embodiment, the costs may include the amount of fuel or energy required to complete the route based on the routing information and an average cost per mile. In some embodiments, an autonomous vehicle may provide the cost information while in other embodiments the cost information may be calculated by the method based on the routing information and historical cost information.

In step 242, the method determines if a route is ongoing.

If the route is ongoing the method monitors the route and costs associated with the route in step 243.

In one embodiment, the method may receive an indication of the amount of fuel or energy expended by the autonomous vehicle and the distance currently traveled. Using this information, the method calculates the average cost of the route to date and projects/updates the cost of the route for the remainder of the route.

In step 244, the method updates the cost efficiency of the autonomous vehicle after determining that the route has ended in step 242.

In one embodiment, the method determines the amount of energy or fuel spent during the route and obtains the final route distance and time. The method uses these data points to calculate the average fuel or energy efficiency for the given route.

In one embodiment, the method may be performed for each unique route and each unique route may be averaged to obtain an overall cost efficiency of the autonomous vehicle. In some embodiments, the method may segment routes based on routing characteristics. For example, the method may discard routes with unusually high levels of traffic. As a second example, the method may classify routes into long trips and short trips. As a third example, the method may classify routes into city or country routes. Each segmented route type may be associated with an aggregated cost efficiency.

Figure 2F:
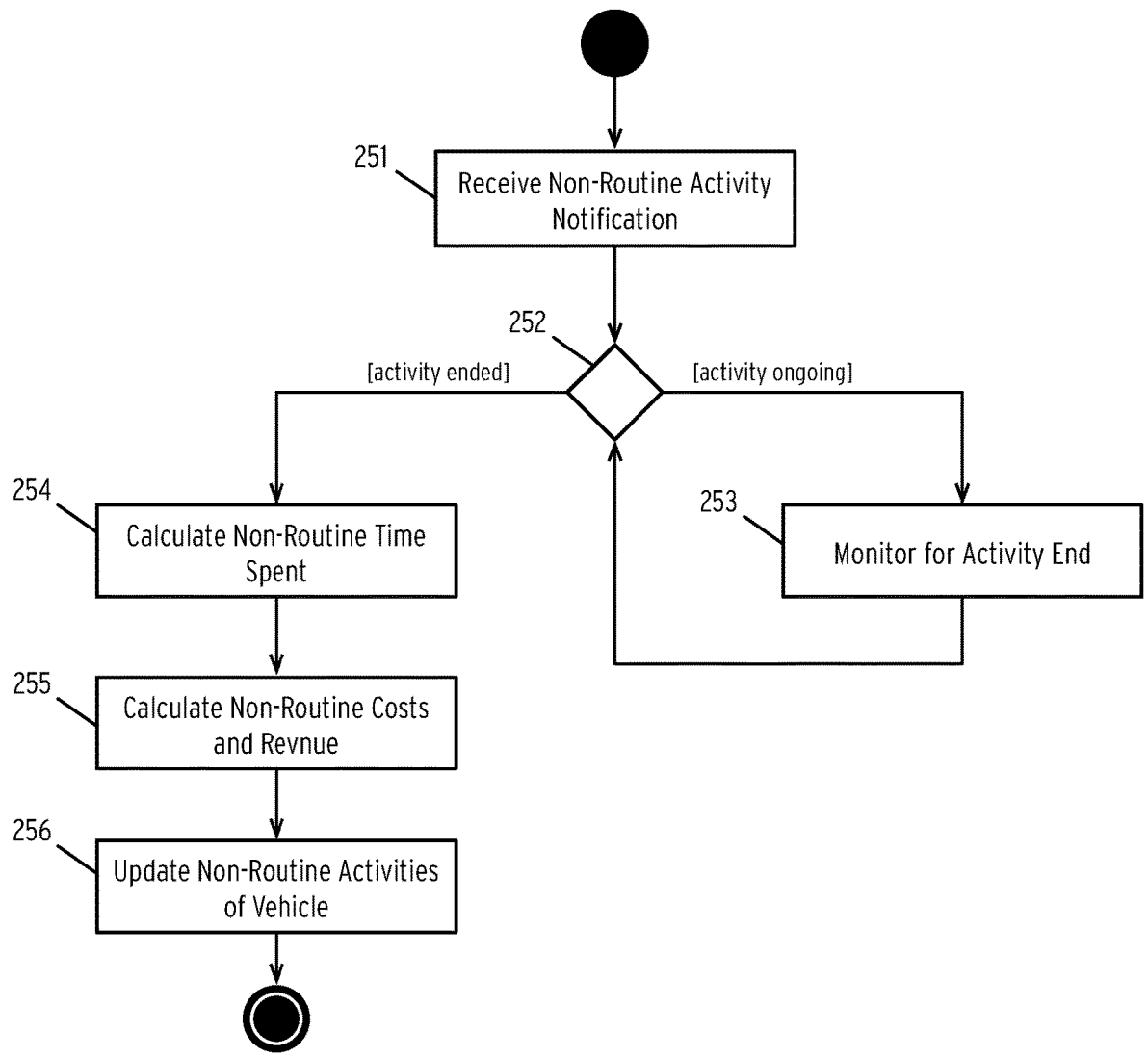
FIG. 2F is a flow diagram illustrating a method for updating autonomous vehicle non-routine activity statistics according to some embodiments of the disclosure.

FIG. 2F is a flow diagram illustrating a method for updating autonomous vehicle non-routine activity statistics according to some embodiments of the disclosure.

With the advent of autonomous vehicles, many autonomous vehicles are being repurposed during "down times" when such autonomous vehicles are not used by their primary occupants/owners. The repurposing of autonomous vehicles presents an additional metric that may be considered by prospective purchasers that did not previously exist with non-autonomous vehicles.

In step 251, the method receives non-routine activity notifications.

In one embodiment, a non-routine activity notification may be generated by the processor of an autonomous vehicle in response to a signal instructing the autonomous vehicle to perform a non-routine activity. For example, during evening hours when the vehicle is not in use, a third-party may instruct the autonomous vehicle to perform a given task. This instruction is logged by the autonomous vehicle prior to performing the task and may be transmitted to and received by the method.

In step 252, the method monitors the performance of the autonomous vehicle to determine whether the non-routine activity is ongoing.

If the activity is ongoing the method monitors the activity to determine if the activity has ended, step 253. In some embodiments, the autonomous vehicle may transmit a signal to the method indicating the activity has ended. In other embodiments, the method may monitor the engine performance to determine when the engine is idle for a predetermined amount of time (in order to avoid false positives when the engine is temporary off).

If the method determines that the non-routine activity has ended, the method calculates the time the autonomous vehicle spent performing the non-routine activity, step 254.

In one embodiment the method may calculate this time based on the notifications received from the autonomous vehicle. Alternatively, or in conjunction with the foregoing, the method may calculate (or confirm) the time based on engine start and stop times.

In step 255, the method calculates the costs and revenues associated with the non-routine activity.

In one embodiment, the costs associated with the non-routine activity may comprise the costs of fuel spent, tolls incurred, traffic tickets incurred, and any other cost associated with performing the non-routine activity. In some embodiments, the costs may be offset by revenues made by the autonomous vehicle for performing the non-routine activity. For example, a service provider may reimburse the autonomous vehicle for any fuel or tolls spent.

The method may further calculate the revenues associated with the non-routine activity. In some embodiments, this revenue may be specified by the operator of the autonomous vehicle during the non-routine activity. For example, the initial instruction to perform a non-routine activity may be associated with a "contract price" for performing the non-routine activity. This price may be associated with various conditions or milestones that must be met. Additionally, a completion handshake may be made between the autonomous vehicle and the operator of the non-routine activity whereby the operator confirms the amount paid for the non-routine activity.

In one embodiment, the method deducts and costs from the revenue to obtain the total profit of the non-routine activity.

In step 256, the method updates the non-routine activities of the autonomous vehicle.

In one embodiment, the method increments the number of non-routine activities performed by the autonomous vehicle. The method may additionally increase the total profits of the autonomous vehicle associated with non-routine activities.

Figure 3A:
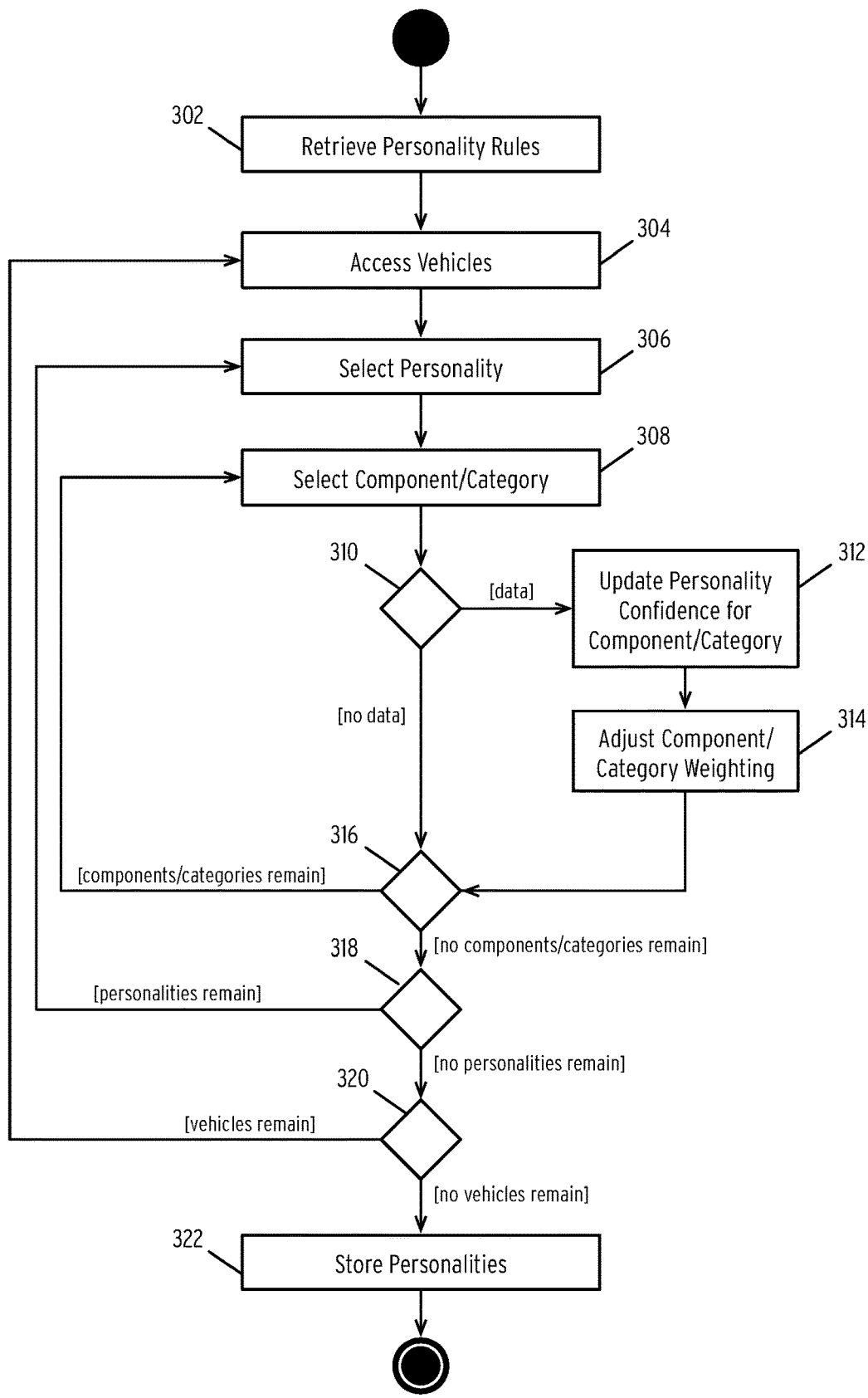
FIG. 3A is a flow diagram illustrating a method for generating autonomous vehicle personalities according to some embodiments of the disclosure.

FIG. 3A is a flow diagram illustrating a method for generating autonomous vehicle personalities according to some embodiments of the disclosure.

In step 302, the method retrieves a set of personality rules.

In one embodiment, a personality rule comprises a set of statistical categories or a set of parts associated with the personality. Each statistical category or part includes a set of conditions for meeting the personality constraints. For example, a given personality of low maintenance may include a set of parts of an autonomous vehicle that affect the personality score. Each part may include a set of fault and/or repair constraints that define the characteristics of the part required to meet the personality. For example, to meet a low maintenance personality a given part may be required to only have a specific number of faults or repairs in a given time period or mileage period.

In step 304, the method accesses one or more vehicles.

In one embodiment, accessing a vehicle comprises retrieving an autonomous vehicle object generated as discussed in the preceding Figures. In some embodiments, the autonomous vehicle object may already be associated with one or more personalities. In this embodiment, the method may update the confidence level of those personalities. If the autonomous vehicle object does not have a personality, the method proceeds in establishing an initial personality for the autonomous vehicle.

In step 306, the method selects a given personality from the list of personalities represented by personality rules.

In step 308, the method selects a given component or statistical categories associated with the personality.

In step 310, the method determines if data exists for the given category or part.

If no data exists, the method determines if any categories or components remain to be inspected for the given personality in step 316.

Alternatively, if the selected autonomous vehicle object contains data relevant to the categories or components, the method updates the personality based on the data in step 312.

In one embodiment, the method retrieves the component or category data and compares the existing data to the personality requirements for the given category or component. For example, if the given category meets the personality requirements, the category may be deemed as supporting the selected personality. In this scenario, the method updates a confidence score for the personality based on the matching category/component.

In step 314, the method adjusts the weighting of the category or component.

In some embodiments, certain categories or components may contribute more to the confidence of the personality. For example, engine faults may weigh highly against a low maintenance personality while low fluid levels may only weight marginally against a low maintenance personality. In some embodiments, a given personality may include weights assigned to each component/category selected in step 308. Thus, the method factors the weights when increasing the confidence of the personality assignment. Thus, an autonomous vehicle having components with faults, where those components are not weighted heavily, may be assigned to a high maintenance personality while the confidence of that personality may be set to a low value.

The method repeats steps 308 through 314 for each remaining part (step 316). The method additionally repeats steps 306 through 316 for each personality (step 318) and steps 304 through 318 for each autonomous vehicle (step 320).

Thus, at the completion of step 320, the method assigns each autonomous vehicle to each personality with a corresponding confidence score based on the collected and parsed autonomous vehicle data.

In step 322, the method stores the personalities.

In one embodiment, the method may store each personality for each autonomous vehicle as part of an autonomous vehicle object. In some embodiments, the method illustrated in FIG. 3A may be re-executed periodically to continuously refine the personality assignments. In some embodiments, the method illustrated in FIG. 3A may be executed in conjunction with the receipt of new autonomous vehicle data parsed in the manners depicted in FIGS. 2A-2F.

Although the method illustrated in FIG. 3A is capable of assigning a given autonomous vehicle to a set of personalities, the method may prove computationally expensive as the number of autonomous vehicles, data points, and personalities increases. Thus, the disclosed embodiments further provide an automated technique for predicting personalities using clustering algorithms, NLP synthesis routines, and neural networks. Examples of these algorithms are described in more detail below.

Figure 3B:
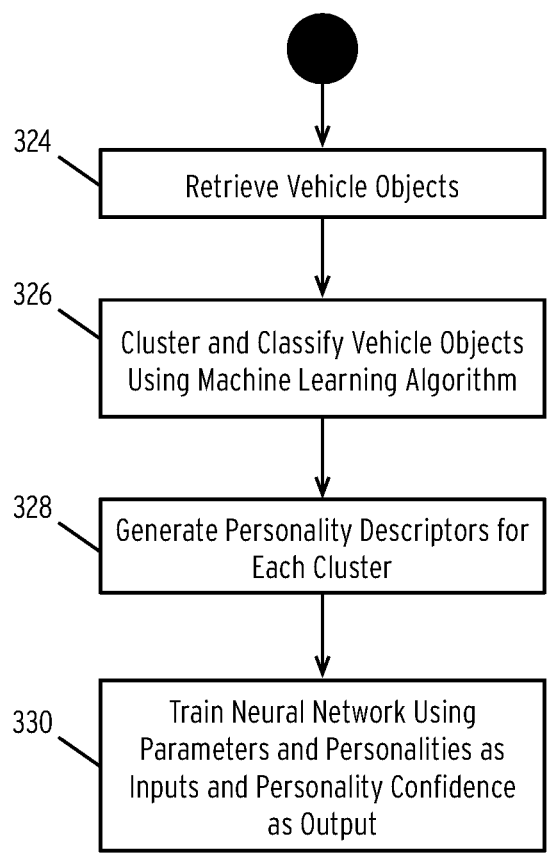
FIG. 3B is a flow diagram illustrating a method for generating autonomous vehicle personalities using machine learning algorithms according to some embodiments of the disclosure.

FIG. 3B is a flow diagram illustrating a method for generating autonomous vehicle personalities using machine learning algorithms according to some embodiments of the disclosure.

In step 324, the method retrieves autonomous vehicle objects.

In one embodiment, the autonomous vehicle object comprises an identification of a vehicle and one or more autonomous vehicle statistics generated in the embodiments discussed above which are incorporated herein by reference in their entirety.

In step 326, the method clusters and classifies the autonomous vehicle objects using a machine learning algorithm.

For purposes of step 326, each autonomous vehicle object may be considered as a vector of statistics (e.g., repair statistics, decision making statistics, etc.). Given the large number of autonomous vehicle objects, the ability of human editors to identify patterns of clustering in a potentially large dataset may be significantly challenging.

Thus, in step 326, the method employs a clustering routing to automatically identify clusters of autonomous vehicle objects based on the statistics included within the autonomous vehicle vectors.

Various clustering algorithms may be used provided that the algorithms support the clustering of high-dimensional data. As can be seen, the vectors representing the autonomous vehicle objects may include potentially thousands of dimensions given the number of statistical categories. Thus, in some embodiments a subspace clustering, projected clustering, correlation clustering, or combination of these clustering techniques may be used to cluster the autonomous vehicle objects into unique subspaces.

In some embodiments, the output of step 326 may comprise a series of cluster vectors representing the clustering parameters identified using the cluster algorithm(s). Each cluster vector may additionally maintain a backward reference to the autonomous vehicle objects associated with the cluster.

In step 328, the method generates a personality descriptor for each cluster.

As described previously, a cluster vector identifies the statistics used to cluster a subset of the autonomous vehicle objects. As example, the cluster vector may include a high transmission repair frequency, a low route efficiency, and a high general critical fault level. This vector indicates that the cluster generally may be categorized as a "high cost" personality.

In order to convert the cluster vector to a personality label, the method may utilize various NLP techniques. First, the method may extract the make, model, and year of each autonomous vehicle in the cluster. The method may then extract a plurality of reviews, user comments, or other text descriptions of the autonomous vehicles. These text-based descriptions may be obtained by scraping third-party autonomous vehicle websites, manufacturer sites, and any source providing such data.

The method takes these text-based descriptions and use NLP sentiment analysis routine to gauge common sentiments extracted from the reviews. In one embodiment, the sentiment analysis outputs a listing of potential sentiments for the given input dataset. For example, the method may generate the sentiments "unreliable," "high cost," "comfortable interior," "low price," and "frequent repairs." As can be seen, some sentiments are unrelated to the cluster vector. Specifically, comfortable interior is not clearly correlated to the cluster vector.

The method may rank the sentiments based on the cluster vector based on the type of statistics included within the vector. For example, the method may compare the similarity of the cluster vector statistic types to the sentiments. As an example the cluster statistic "high transmission repair frequency" is strongly correlated with the sentiment "frequent repairs" while less correlated with "comfortable interior" and "low price." Thus, the method ranks the "frequent repairs" sentiment may be ranked higher than other sentiments. Similarly, the "unreliable" sentiment may be ranked higher than other sentiments.

In this manner, the method generates a plurality of high-ranking sentiments that may be utilized as personality types. In one embodiment, the method may utilize these sentiment types to "seed" future iterations of the method. That is, the method may be refined to rank previously detected sentiments higher than newly found sentiments, ensuring that the personality space is not overwhelmed with sparsely populated personalities.

In some embodiments, the method may additionally assign a confidence to the personalities. In some embodiments, the method may distribute the percentage of confidences across all personalities such that the total score of personalities equals one. In other embodiments, each personality may be scored independently.

In step 330, the method trains a neural network using the autonomous vehicle object parameters and personality.

In the illustrated embodiment, the output of step 328 is, effectively, an autonomous vehicle object and a personality. Thus, the output of step 328 may be utilized as a training data set of a machine learning classifier. In essence, the method utilizes a batch of autonomous vehicle objects assigned a personality using the clustering routine and NLP routines in order to train a generalized machine learning system that can classify future autonomous vehicle objects.

In the illustrated embodiment, a neural network is utilized as the machine learning system, although other machine learning models may be utilized. In the illustrated embodiment, the autonomous vehicle objects assigned a personality are used as the training input and weights of the nodes of the neural network are tuned to obtain the correct output, the output comprising the identified personality.

In one embodiment, each personality detected in step 328 may be assigned a separate neural network. In alternative embodiments, the output of the neural network may comprise a vector with a dimensionality equal to the total number of personalities with each dimension representing a confidence that the given input matches the personality. In one embodiment, various types of neural networks may be used such as convolutional neural networks, deep neural networks, recurrent neural networks, long short-term memory neural networks, etc.

Figure 4:
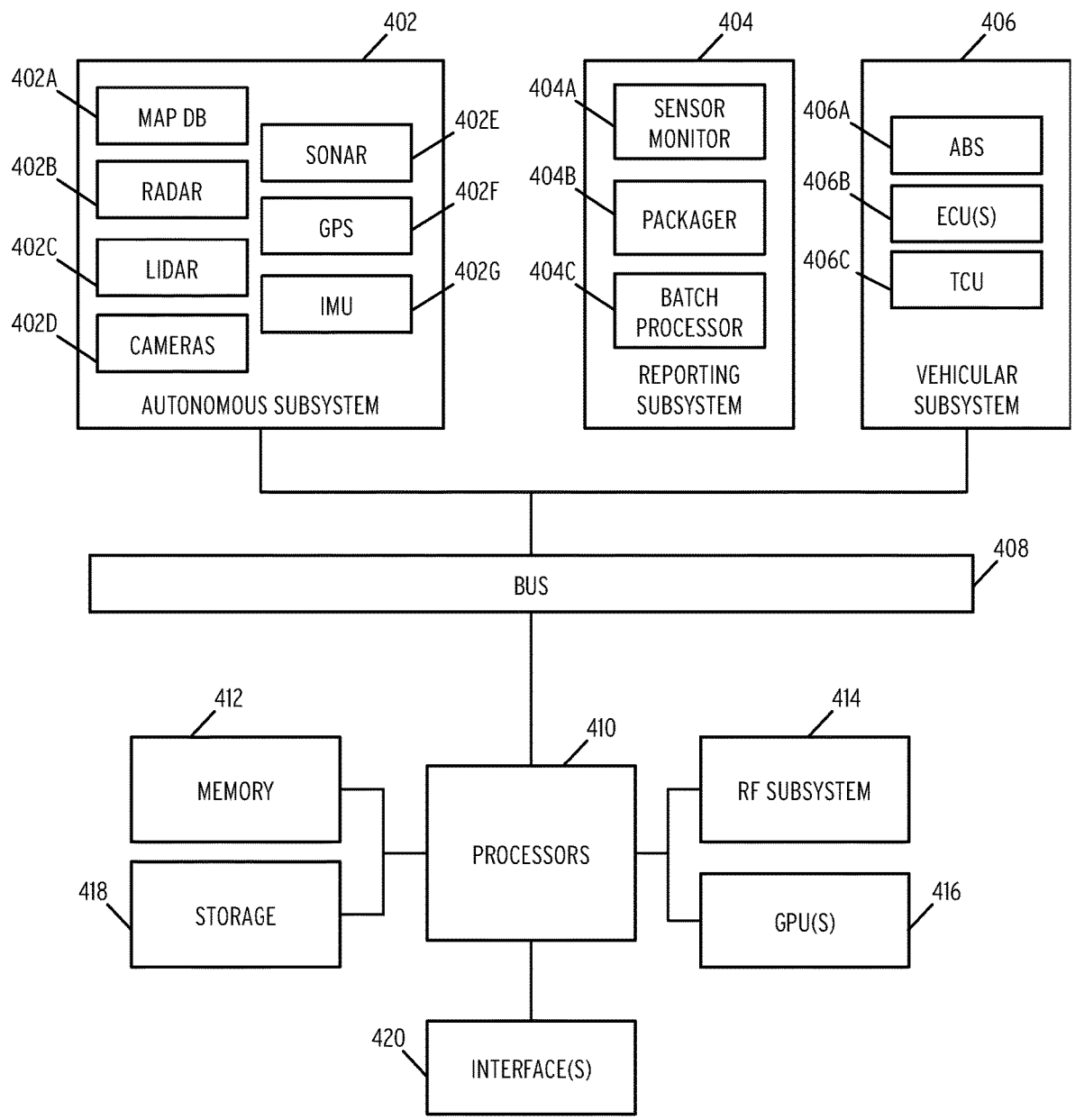
FIG. 4 is a block diagram of an autonomous vehicle according to some embodiments of the disclosure.

FIG. 4 is a block diagram of an autonomous vehicle according to some embodiments of the disclosure.

The system illustrated in FIG. 4 may be installed entirely within a vehicle. In some embodiments, some components (e.g., components and subsystems other than subsystem (404)) may comprise existing autonomous vehicle subsystems.

The system includes an autonomous vehicle subsystem (402). In the illustrated embodiment, autonomous vehicle subsystem (402) includes map database (402A), radar devices (402B), Lidar devices (402C), digital cameras (402D), sonar devices (402E), GPS receivers (402F), and inertial measurement units (402G). Each of the components of autonomous vehicle subsystem (402) comprise standard components provided in most current autonomous vehicles. In one embodiment, map database (402A) stores a plurality of high-definition three-dimensional maps used for routing and navigation. Radar devices (402B), Lidar devices (402C), digital cameras (402D), sonar devices (402E), GPS receivers (402F), and inertial measurement units (402G) may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem (406) is additionally included within the system. Vehicular subsystem (406) includes various anti-lock braking systems (406A), engine control units (402B), and transmission control units (402C). These components may be utilized to control the operation of the autonomous vehicle in response to the streaming data generated by autonomous vehicle subsystem (402A). The standard autonomous vehicle interactions between autonomous vehicle subsystem (402) and vehicular subsystem (406) are generally known in the art and are not described in detail herein.

The processing side of the system includes one or more processors (410), short-term memory (412), an RF system (414), graphics processing units (GPUs) (416), long-term storage (418) and one or more interfaces (420).

The one or more processors (410) may comprise central processing units, FPGAs, or any range of processing devices needed to support the operations of the autonomous vehicle. Memory (412) comprises DRAM or other suitable volatile RAM for temporary storage of data required by processors (410). RF system (414) may comprise a cellular transceiver and/or satellite transceiver. Long-term storage (418) may comprise one or more high-capacity solid-state drives (SSDs). In general, long-term storage (418) may be utilized to store, for example, high-definition maps, routing data, and any other data requiring permanent or semi-permanent storage. GPUs (416) may comprise one more high throughput GPU devices for processing data received from autonomous vehicle subsystem (402A). Finally, interfaces (420) may comprise various display units positioned within the autonomous vehicle (e.g., an in-dash screen).

The system additionally includes a reporting subsystem (404) which performs all of the data collection required by the methods illustrated in the preceding Figures. The reporting subsystem (404) includes a sensor monitor (404A) which is connected to bus (408) and records sensor data transmitted on the bus (408) as well as any log data transmitted on the bus. The reporting subsystem (404) may additionally include one or more endpoints to allow for system components to transmit log data directly to the reporting subsystem (404).

The reporting subsystem (404) additionally includes a packager (404B). In one embodiment, packager (404B) retrieves the data from the sensor monitor (404A) or endpoints and packages the raw data for transmission to a central system (illustrated in FIG. 5). In some embodiments, packager (404B) may be configured to package data at periodic time intervals. Alternatively, or in conjunction with the foregoing, packager (404B) may transmit data in real-time and may compress data to facilitate real-time communications with a central system.

The reporting subsystem (404) additionally includes a batch processor (404C). In one embodiment, the batch processor (404C) is configured to perform any preprocessing on recorded data prior to transmittal. For example, batch processor (404C) may perform compression operations on the data prior to packaging by packager (404B). In another embodiment, batch processor (404C) may be configured to filter the recorded data to remove extraneous data prior to packaging or transmittal. In another embodiment, batch processor (404C) may be configured to perform data cleaning on the recorded data to conform the raw data to a format suitable for further processing by the central system.

Each of the devices is connected via a bus (408). In one embodiment, the bus (408) may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 5:
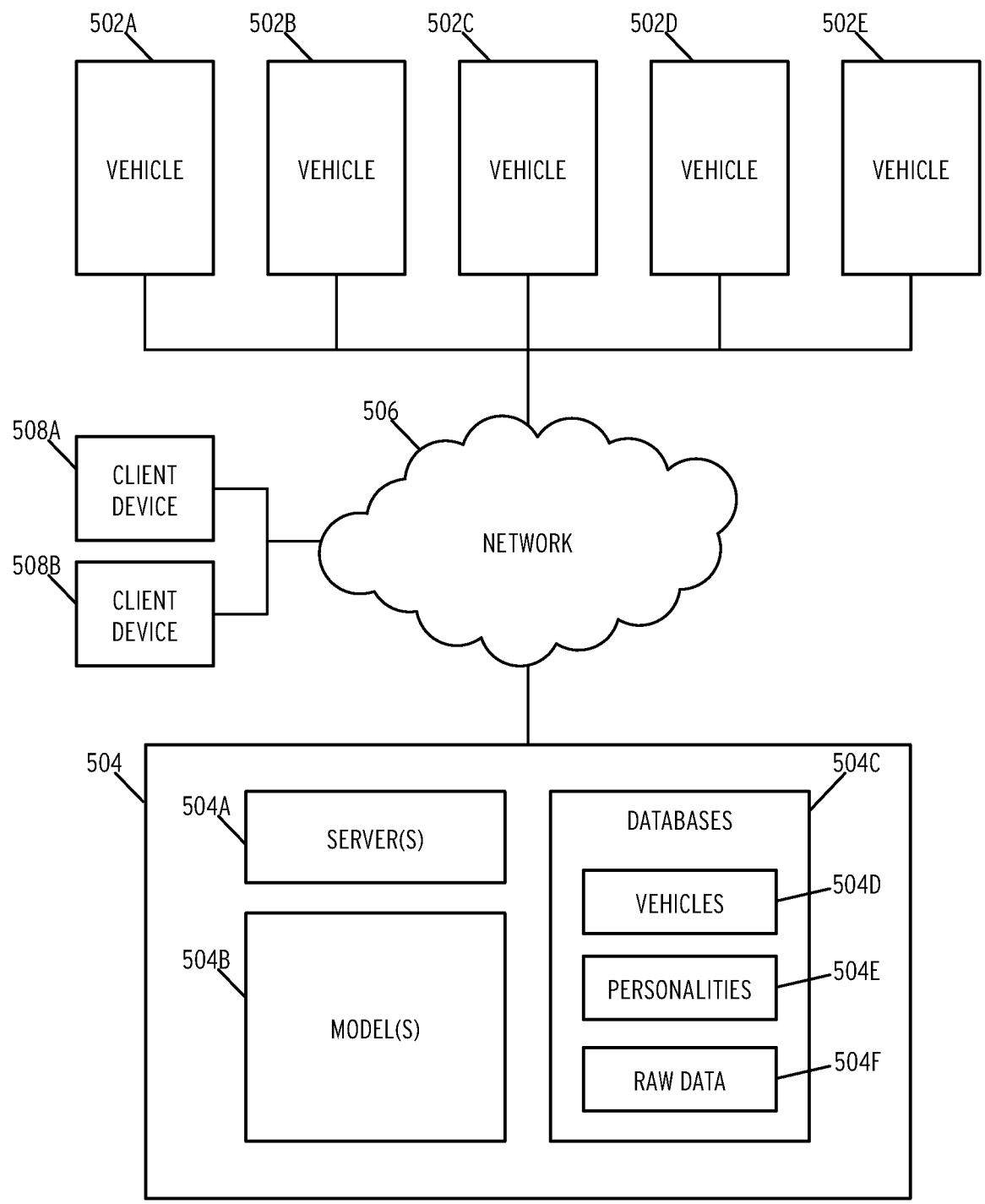
FIG. 5 is a block diagram of a centralized autonomous vehicle operations system according to some embodiments of the disclosure.

FIG. 5 is a block diagram of a centralized autonomous vehicle operations systems according to some embodiments of the disclosure.

As illustrated, the system includes a number of autonomous vehicles (502A-502E). In one embodiment, each autonomous vehicle may comprise an autonomous vehicle such as that depicted in FIG. 4, the disclosure of which is incorporated herein by reference in its entirety. Each autonomous vehicle (502A-502E) may communication with a central system (504) via a network (506). In one embodiment, network (506) comprises a global network such as the Internet.

The system additionally includes a plurality of client devices (508A, 508B). In the illustrated embodiment, client devices (508A, 508B) may comprise any personal computing device (e.g., a laptop, tablet, mobile phone, etc.). Client devices (508A, 508B) may issue requests for data from central system (504). In one embodiment, client devices (508A, 508B) transmit requests for data to support mobile applications or web page data, as described previously.

Central system (504) includes a plurality of servers (504A). In one embodiment, servers (504A) comprise a plurality of front end webserver configured to serve responses to client device (508A, 508B). The servers (504A) may additionally one or more application server configured to perform the operations discussed in the previous flow diagrams.

Central system (504) additionally includes a plurality of models (504B). In one embodiment, the models (504B) may be generated by the processes described previously. Specifically, models (504B) may store one or more neural networks for classifying autonomous vehicle objects into various personalities. The models (504B) may additionally include models for predicting future events as discussed previously. In some embodiments the models (504B) may store a combination of neural networks and other machine learning models discussed previously.

Central system (504) additionally includes one or more databases (504C). The databases (504C) may include database record for vehicles (504D), personalities (504E), and raw data (504F). In one embodiment, the vehicles (504D) may include the autonomous vehicle objects discussed throughout. Personalities (504E) may include details regarding the personalities including rules defining conditions for satisfying a personality. Raw data (504F) may comprise an unstructured database for storing raw data received from sensors and logs as discussed previously.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving data from an autonomous vehicle;
   generating a vector representing the autonomous vehicle based on the data;
   classifying the vector into one or more personalities using a trained model, each of the one or more personalities associated with a plaintext sentiment generated by the trained model;
   receiving a search query from a user, the search query comprising a text query;

identifying a sentiment of the search query;
identifying one or more autonomous vehicles responsive to the sentiment based on personalities assigned to the one or more autonomous vehicles, the one or more autonomous vehicles including the autonomous vehicle; and
transmitting the one or more autonomous vehicles to the user.

2. The method of claim 1, the data comprising data recorded by one or more sensors installed on the autonomous vehicle.

3. The method of claim 2, the data further comprising log data recorded by monitoring a bus of the autonomous vehicle.

4. The method of claim 1, the generating the vector comprising calculating frequencies and amounts of repairs and faults included within the data.

5. The method of claim 1, the generating the vector comprising calculating amounts of rapid accelerations and decelerations included within the data.

6. The method of claim 1, the generating the vector comprising identifying one or more decision points included within the data.

7. The method of claim 1, the generating the vector comprising calculating one or more of a routing efficiency or cost efficiency based on routing data included within the data.

8. The method of claim 1, the generating the vector comprising calculating costs and profits generated by the autonomous vehicle during non-routine activities based on the data.

9. The method of claim 1, the classifying the vector into one or more personalities comprising analyzing each component of the autonomous vehicle and assigning a personality to the autonomous vehicle if statistics associated with a respective component exceed a pre-defined threshold.

10. The method of claim 1, further comprising:
selecting a set of autonomous vehicle objects;
clustering the set of autonomous vehicle objects into a set of clusters;
assigning each cluster in the set of clusters a personality identifier using a natural language processing (NLP) algorithm; and
training the trained model using the clusters of autonomous vehicle objects and the assigned personality identifiers, wherein the classifying the vector into one or more personalities comprises inputting the vector into the model.

11. A system comprising:
a processor; and
a storage medium for tangibly storing thereon program logic for execution by the processor, the stored program logic comprising:
logic, executed by the processor, for receiving data from an autonomous vehicle;
logic, executed by the processor, for generating a vector representing the autonomous vehicle based on the data;
logic, executed by the processor, for classifying the vector into one or more personalities using a trained model, each of the one or more personalities associated with a plaintext sentiment generated by the trained model;
logic, executed by the processor, for receiving a search query from a user, the search query comprising a text query;
identifying a sentiment of the search query;
logic, executed by the processor, for identifying one or more autonomous vehicles responsive to the sentiment based on personalities assigned to the one or more autonomous vehicles, the one or more autonomous vehicles including the autonomous vehicle; and
logic, executed by the processor, for transmitting the one or more autonomous vehicles to the user.

12. The system of claim 11, the data comprising data recorded by one or more sensors installed on the autonomous vehicle.

13. The system of claim 12, the data further comprising log data recorded by monitoring a bus of the autonomous vehicle.

14. The system of claim 11, the generating the vector comprising calculating frequencies and amounts of repairs and faults included within the data.

15. The system of claim 11, the generating the vector comprising calculating amounts of rapid accelerations and decelerations included within the data.

16. The system of claim 11, the generating the vector comprising identifying one or more decision points included within the data.

17. The system of claim 11, the generating the vector comprising calculating one or more of a routing efficiency or cost efficiency based on routing data included within the data.

18. The system of claim 11, the generating the vector comprising calculating costs and profits generated by the autonomous vehicle during non-routine activities based on the data.

19. The system of claim 11, the classifying the vector into one or more personalities comprising analyzing each component of the autonomous vehicle and assigning a personality to the autonomous vehicle if statistics associated with a respective component exceed a pre-defined threshold.

20. The system of claim 11, the stored program logic further comprising:
logic, executed by the processor, for selecting a set of autonomous vehicle objects;
logic, executed by the processor, for clustering the set of autonomous vehicle objects into a set of clusters;
logic, executed by the processor, for assigning each cluster in the set of clusters a personality identifier using a natural language processing (NLP) algorithm; and
logic, executed by the processor, for training the trained model using the clusters of autonomous vehicle objects and the assigned personality identifiers, wherein the classifying the vector into one or more personalities comprises inputting the vector into the model.

\* \* \* \* \*